(12) United States Patent  
Chiu et al.

(10) Patent No.: US 11,980,315 B2
(45) Date of Patent: May 14, 2024

(54) COLD BREW COFFEE MAKER AS BREWED BY PRESSURE-BOOSTING WATER

(71) Applicants: Hsin Tien Chiu, Hukou Township (TW); Sheng-Yu Liao, Hukou Township (TW)

(72) Inventors: Hsin Tien Chiu, Hukou Township (TW); Sheng-Yu Liao, Hukou Township (TW)

( * ) Notice: Subject to any disclaimer, the term of this patent is extended or adjusted under 35 U.S.C. 154(b) by 409 days.

(21) Appl. No.: 17/645,313

(22) Filed: Dec. 21, 2021

(65) Prior Publication Data

US 2023/0106682 A1 Apr. 6, 2023

(30) Foreign Application Priority Data

Sep. 27, 2021 (TW) .................................. 110211322

(51) Int. Cl.
| | |
|---|---|
| *A47J 31/00* | (2006.01) |
| *A23F 5/26* | (2006.01) |
| *A47J 31/06* | (2006.01) |
| *A47J 31/44* | (2006.01) |
| *A47J 31/46* | (2006.01) |
| *A47J 43/042* | (2006.01) |

(52) U.S. Cl.
CPC ............. *A47J 31/002* (2013.01); *A23F 5/262* (2013.01); *A47J 31/06* (2013.01); *A47J 31/4403* (2013.01); *A47J 31/467* (2013.01); *A47J 31/469* (2018.08); *A47J 43/042* (2013.01)

(58) Field of Classification Search
CPC ........ A47J 31/002; A47J 31/06; A47J 31/467; A47J 31/469; A47J 31/4403; A47J 43/042; A23F 5/262
See application file for complete search history.

(56) References Cited

U.S. PATENT DOCUMENTS

| | | | |
|---|---|---|---|
| 2018/0132653 A1* | 5/2018 | Nuss | A47J 31/521 |
| 2021/0007536 A1* | 1/2021 | Nicastro | A47J 31/0663 |
| 2021/0120999 A1* | 4/2021 | Anthony | A47J 31/0663 |
| 2021/0251417 A1* | 8/2021 | Kramer | A47J 31/20 |
| 2021/0262207 A1* | 8/2021 | Jenkins | E03C 1/02 |
| 2022/0018589 A1* | 1/2022 | Miller | B67D 1/0861 |

* cited by examiner

*Primary Examiner* — Anthony J Weier
(74) *Attorney, Agent, or Firm* — Wang Law Firm, Inc.

(57) ABSTRACT

A cold brew coffee maker has a water cleaning system connected to a water source; a water pump connected to the water cleaning system, and connected to the pressurized-water storage tank for storing a filtered water in the tank; and a coffee brewing module connected to the pressurized-water storage tank and including: a detachable brewing cup detachably secured to a fixing bracket, a solenoid valve formed between the brewing cup and the pressurized-water storage tank, and a switch panel formed in the main body; whereby upon starting of the pump to suck and filter a feed water, a filtered pressurized water less than 30 degrees centigrade will be delivered into the tank and upon actuation of the switch panel to open the solenoid valve, the pressurized water will be ejected into the cup for brewing coffee.

11 Claims, 11 Drawing Sheets

COLD BREW COFFEE MAKER AS BREWED BY PRESSURE-BOOSTING WATER

BACKGROUND OF THE INVENTION

Coffee is a favorite drink for many people. Coffee is an advantageous drink because:

Coffee can help people feel less tired and increase energy levels.

Coffee contains essential nutrients, including vitamin B2, B5, B3, etc.

It may protect someone from Alzheimer's disease and dementia, or may lower the risk of Parkinson's disease.

It can fight depression.

It may serve as antioxidant in a diet.

Coffee may be brewed with hot water, such as: Americano, Espresso, or even Indian coffee.

Coffee may also be brewed with cold water, iced water, or water at low temperature.

However, none of the prior arts disclose a coffee maker which can simultaneously filter a feed water and also boost the water pressure in order to well agitate, mix, and brew the coffee, especially at low water temperature or room temperature.

SUMMARY OF THE INVENTION a. The object of the present invention is to provide a cold brew coffee maker comprising:

a water cleaning or filtration system including at least a water filter, and connected to a water source;

a water pump having a suction end of the water pump connected to the water cleaning system, and a discharge end of the water pump connected to a pressurized-water storage tank for storing a filtered water in the tank; and a coffee brewing module connected to the pressurized-water storage tank and including: a fixing bracket formed on a cantilever of a main body, a detachable brewing cup detachably secured to the fixing bracket, a solenoid valve formed between the brewing cup and the pressurized-water storage tank, and a switch panel formed in the main body;

whereby upon starting of the pump to suck and filter the feed water, a filtered pressurized water less than 30 degrees centigrade will be delivered into the tank and upon actuation of the switch panel to open the solenoid valve, the pressurized water will be ejected into the cup for efficiently brewing coffee in the cup.

DETAILED DESCRIPTION OF THE DRAWINGS

As shown in FIGS. 1, 2A, 2B, 3 and 4, a preferred embodiment of the present invention comprises: a water cleaning system (or water filtration system) 10, a water pump 20, a pressurized water storage tank 30, and a coffee brewing module 40. The water cleaning system 10 is connected to a water source S. The water pump 20 has its section end 201 connected to the water cleaning system 10, and a discharge end 202 of the pump 20 connected to the pressurized water storage tank 30. The coffee brewing module 40 is connected to the pressurized water storage tank 30.

Figure 9:
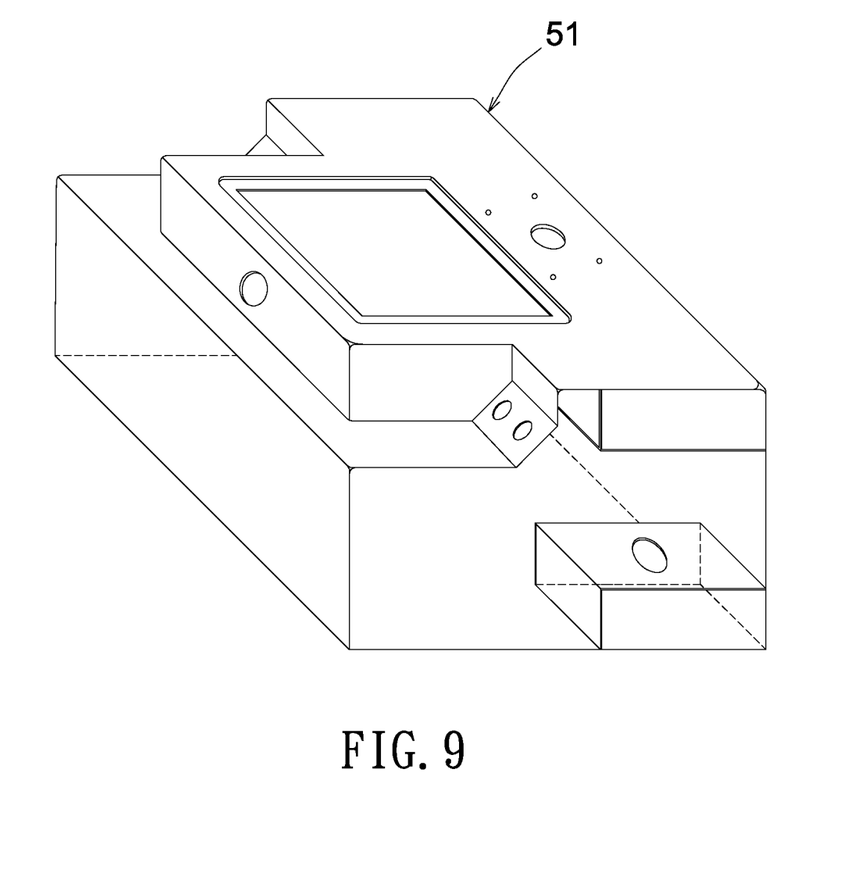
FIG. 9 is a perspective view of a system equipment casing of the present invention.

Also as shown in FIG. 9, the present invention further comprises a main body 50, which includes a system equipment casing 51, and a cantilever 52 installed on and connected to the system equipment casing 51. All the water cleaning system 10, water pump 20 and pressurized water storage tank 30 are installed in the system equipment casing 51. The coffee brewing module 40 is fixed on the cantilever 52. The cantilever 52 extends upwardly from the casing 51 and then extends horizontally in order to fix the coffee brewing module 40 on a holding base 521 formed at an end portion of the cantilever 52. The holding base 521 is formed with an opening 522 for fixing an upper portion of the coffee brewing module 40. A lower portion of the coffee brewing module 40 is formed on a lower or outer side of the holding base 521 of the cantilever 52. The interior of the cantilever 52 is hollow, formed as a rectangular shape.

Figure 1:
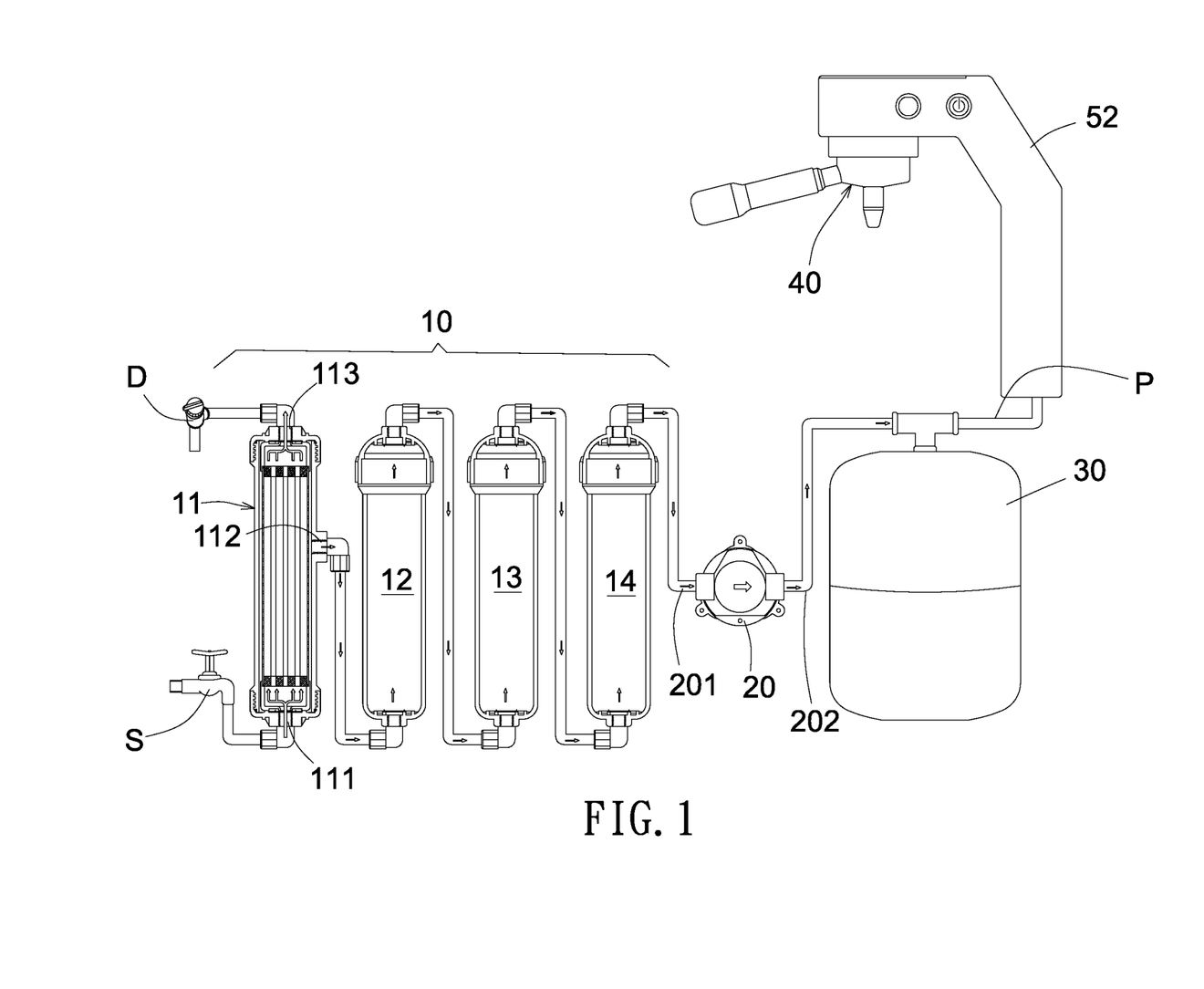
FIG. 1 shows systematic elements of the present invention.

The water cleaning system 10 includes: a hollow silk film filter 11 which can be independently flushed, cleaned and drained; a mineral ceramic ball filter 12; a long-fiber anti-bacterial activated-carbon filter (or a filter filled with anti-bacterial long-fiber, activated carbon) 13; and a silver-copper-titanium anti-bacterial activated-carbon filter (or a filter filled with anti-bacterial long-fiber activated carbon as added with nano silver, copper and titanium) 14.

The feed water including tap water or other water source S is fed into the water cleaning (or filtration system) 10 through the sequence of: the first filter (or the hollow silk film filter) 11, the second filter (or mineral ceramic ball filter) 12, the third filter (or long-fiber anti-bacterial activated-carbon filter) 13, and the fourth filter (or silver-copper-titanium anti-bacterial activated-carbon filter) 14.

The first filter 11 provided with silk film therein having mesh opening of 0.01~0.1 microns so as to filter the bacteria or microbe existing in the feed water as entering the first filter 11 through a water inlet 111 formed at a bottom portion of the first filter 11 and to discharge the filtered water through a water outlet 112 provided at a side portion of the first filter 11 into the second filter 12. Another water outlet 113 is provided at a top portion of the first filter 11, whereby a by-pass filtered water from the first filter 11 may be discharged outwardly through a drain pipe D for additional washing use, or the first filter 11 may be flushed or cleaned independently through the first filter (when closing the outlet 112 temporarily) and the dirty water is then discharged through the outlet 113 and pipe D as shown in FIG. 1.

After passing through the first filter 11, the second filter 12, the third filter 13 and the fourth filter 14, the feed water is filtered and cleaned to remove the dirt and bacteria in the water due to the resonance adsorption or absorption effects by the filling materials in the filters, also to produce clean water having anti-oxidation and odor-removing effects. Meanwhile, micro or tiny water molecules with negative ions and minerals helpful for human health may also exist in the filtered water after passing the water cleaning system 10 as aforementioned.

Figure 2A:
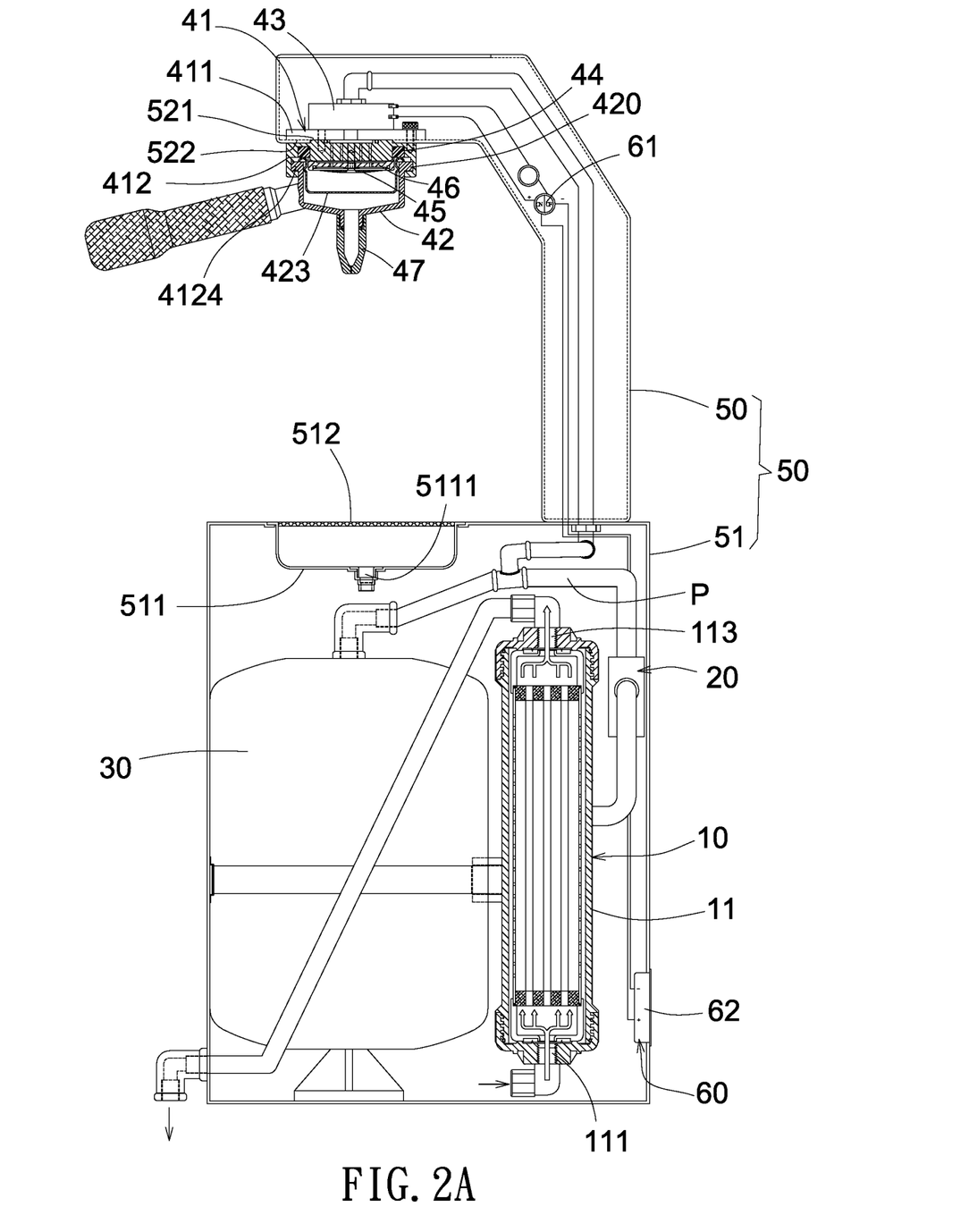
FIG. 2A shows a sectional drawing of the present invention as assembled.

The water pump 20 is provided to suck filtered water from the cleaning system 10 through suction end 201 of the pump 20, and to boost pressure of the water as delivered outwardly through the discharge end 202 of the pump to enter the pressurized-water storage tank 30 for storage of the cleaned or filtered water. A clean-water outlet pipe P is connected to the coffee brewing module 40 to outwardly supply filtered water as stored in the tank 30 through the pipe P in the casing 51, and interior in the cantilever 52 (FIG. 2A).

The coffee brewing module 40 comprises: a fixing bracket 41, a detachable brewing cup 42, and a solenoid valve 43. The fixing bracket 41 includes an upper fixing member 411 and a lower fixing member 412 secured to the holding base 521 of the cantilever 52 and disposed on opposite sides of an opening 522 formed in the holding base 521 of the cantilever 52 (FIGS. 2A, 2B, 5A, 5B, 6A, 6B and 6C). The upper fixing member 411 is formed in an interior in the cantilever, and the lower fixing member 412 is formed outside the cantilever 52. The solenoid valve 43 is secured on the upper fixing member 411 which is fixed on the holding base 521 by screws. The detachable brewing cup 42 is secured to the lower fixing member 412. The coffee brewing module 40 may also be defined as a coffee brewing assembly or unit.

Figure 5A:
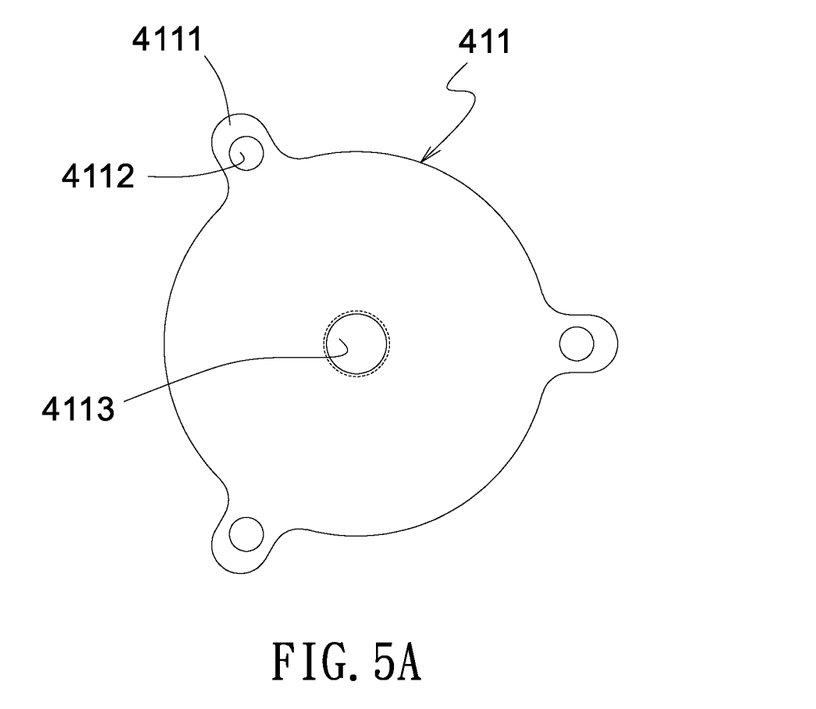
FIG. 5A is a top view of an upper fixing member of the fixing bracket of the present invention.
Figure 5B:
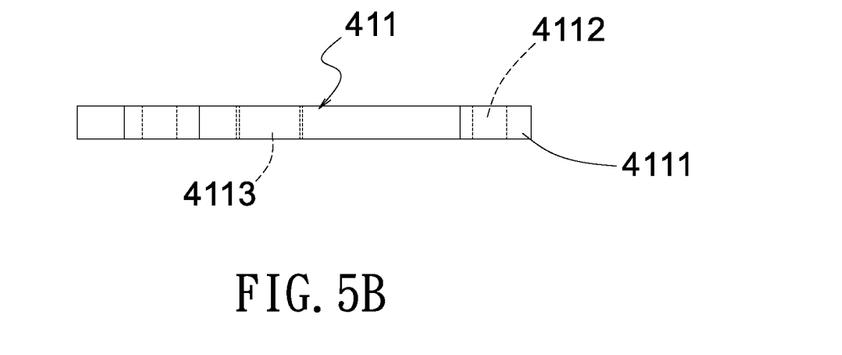
FIG. 5B is a side view of FIG. 5A.

As shown in FIGS. 5A and 5B, the upper fixing member 411 is formed as a round shape, having three lugs 4111 circumferentially formed on the upper fixing member 411. Each lug 4111 is formed with a through hole 4112 therein adapted to be fixed on the cantilever 52. A central through hole 4113 is formed in the central portion of the upper fixing member 411 to allow the filtered water from the tank 30 to flow downwardly, when opening the solenoid valve 43, through the lower fixing member 412 to reach the detachable brewing cup 42.

Figure 6A:
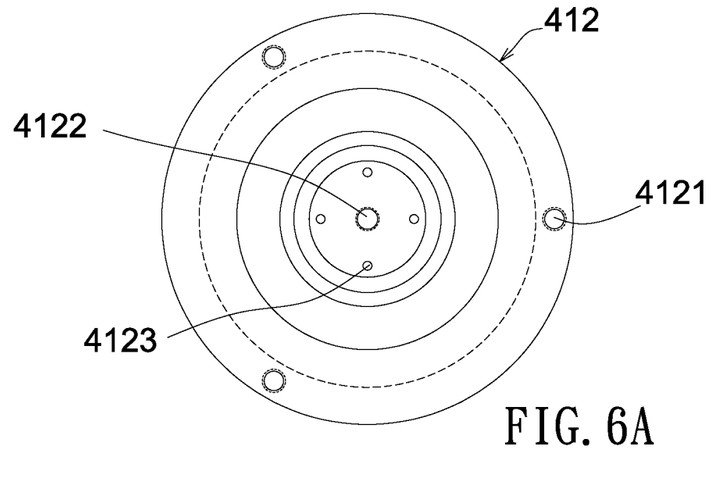
FIG. 6A is a top view of a lower fixing member of the fixing bracket of the present invention.
Figure 6B:
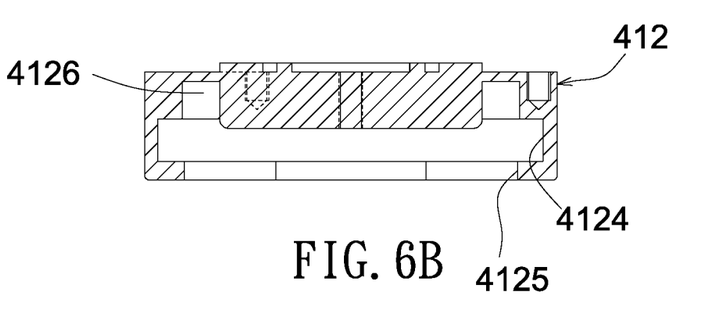
FIG. 6B is a side-view sectional drawing of FIG. 6A.
Figure 6C:
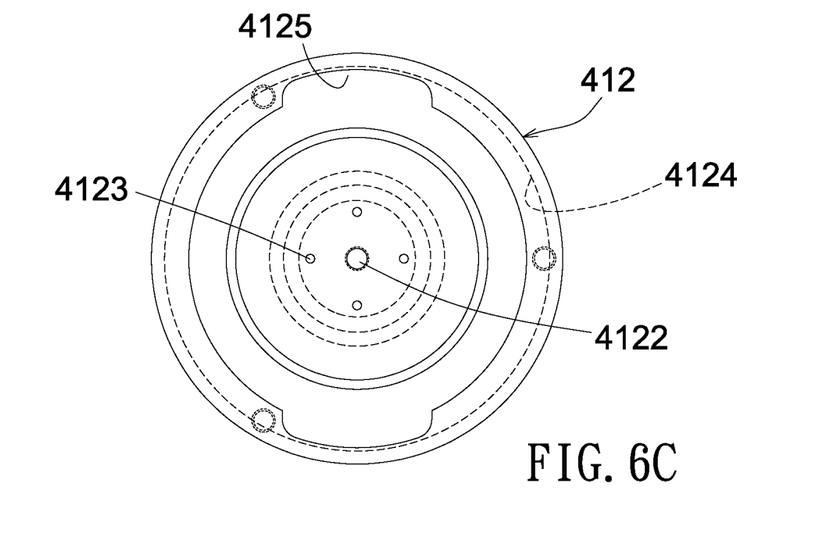
FIG. 6C is a bottom view of FIG. 6A.

As shown in FIGS. 6A, 6B and 6C, the lower fixing member 412, also circular shaped, includes three through holes 4121 formed circumferentially in the lower fixing member 412 adapted to be secured on the holding base 521 by bolts. Each bolt passes through the holes 4112, 4121 in upper and lower fixing member 411, 412 so as to secure the upper and lower fixing members 411, 412 on the holding base 521 of the cantilever 52. The lower fixing member 412 has a screw hole 4122 formed in a central portion of the lower fixing member 412 for securing a filter retainer 46 by screw, and four water releasing holes 4123 around the screw hole 4122 for releasing the filtered water into detachable brewing cup 42 through a first coffee filter 45.

As shown in FIGS. 6A, 6C and 2A, the lower fixing member 412 is circumferentially formed with an annular groove 4124 in order to engage a pair of cup lugs 420 of cup 42 when inserted through a pair of notches 4125 as notched from the groove 4124 and rotated to be engaged with the groove 4024 to thereby secure the cup 42 to the lower fixing member 412. A sealing ring 44 is engaged in a fixing groove 4126 recessed in the lower fixing member 412 in order to seal the parts of the lower fixing member 412 and the cup 42 when assembled, thereby preventing coffee leakage.

As shown in FIGS. 2B, 7A, 7B, 7C, 8A, 8B and 8C, the coffee brewing module 40 further comprises: a first coffee filter 45, and a filter retainer 46 for securing the first coffee filter 45 in the filter retainer 46, which is then secured to the lower fixing member 412, and positioned between the solenoid valve 43 and the cup 42. The retainer 46 includes a central through hole 461, and eight water releasing holes 462 formed through the retainer 46 around the central through hole 461. A spacing chamber 463 is formed in an upper portion of retainer 46 adjacent to the lower fixing member 412, and a filter socket 464 formed in a bottom portion of the retainer 46 for embedding the first coffee filter 45 in the filter socket 464.

Figure 7A:
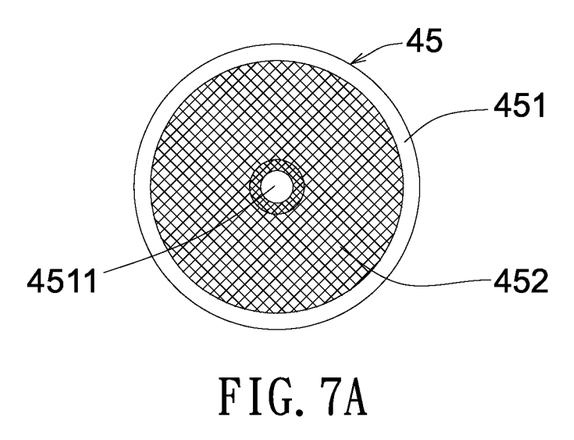
FIG. 7A is a top view of a first coffee filter of the present invention.
Figure 7B:
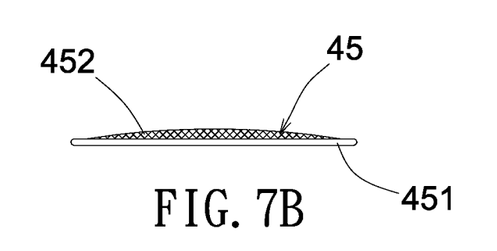
FIG. 7B is a side view of FIG. 7A.
Figure 7C:
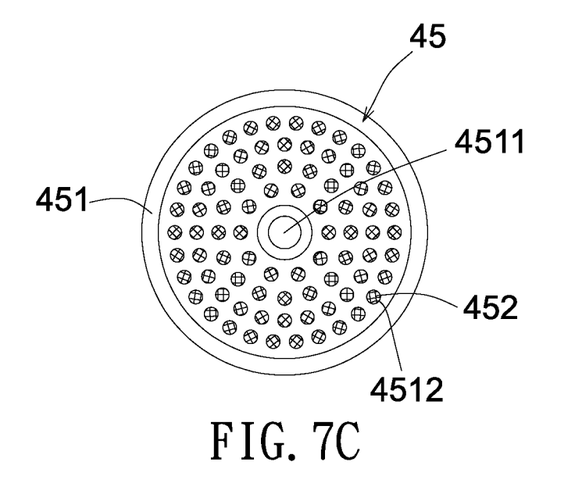
FIG. 7C is a bottom view of FIG. 7A.
Figure 8A:
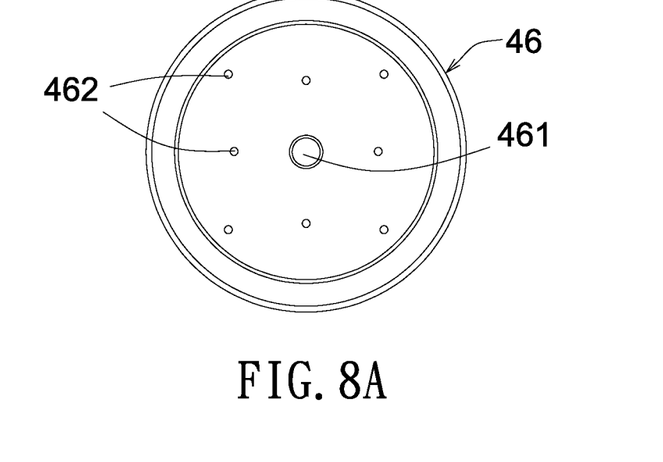
FIG. 8A is a top view of a filter retainer of the present invention.
Figure 8B:
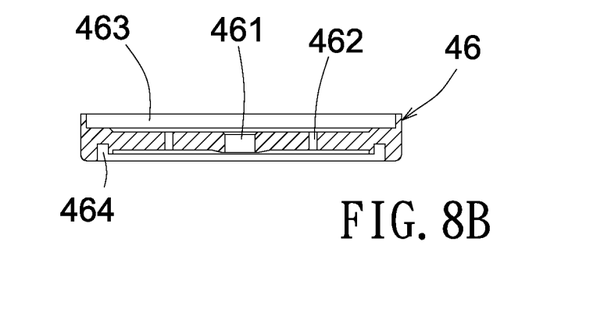
FIG. 8B is a side-view sectional drawing of FIG. 8A.
Figure 8C:
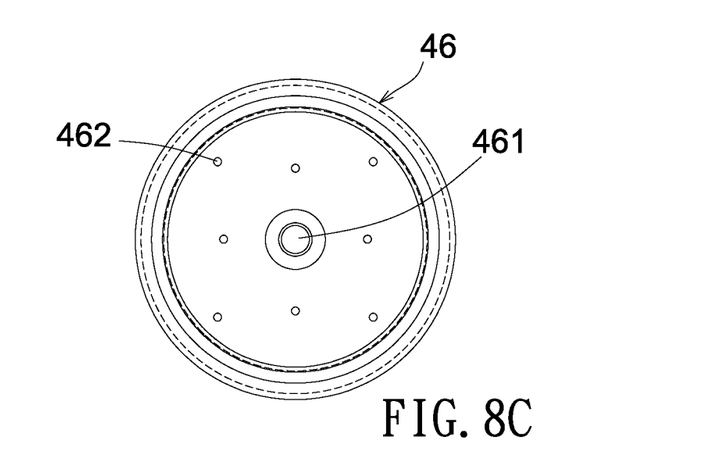
FIG. 8C is a bottom view of FIG. 8A.

The first coffee filter 45 includes a filter holder 451 and a mesh member 452 embedded in the filter holder 451. The filter holder 451 is formed with a central through hole 4511 so that a bolt (not shown) may be provided to insert through the through hole 4511 of the filter 45 and the through hole 461 of the retainer 46 for firmly securing the filter 45, and retainer 46 to the lower fixing member 412. The mesh member 452 includes a plurality of filtration perforations 4512 formed through the mesh member 452. When the filtered water enters the spacing chamber 463 through the releasing holes 4123, the water will then be released downwardly through the holes 462 of retainer 46 and perforations 4512 of filter 45 to be led into the cup 42 having coffee powder filled therein. The filter 45 may preclude the backflow of the filtered water carrying the coffee powder back into the tank 30.

Figure 2B:
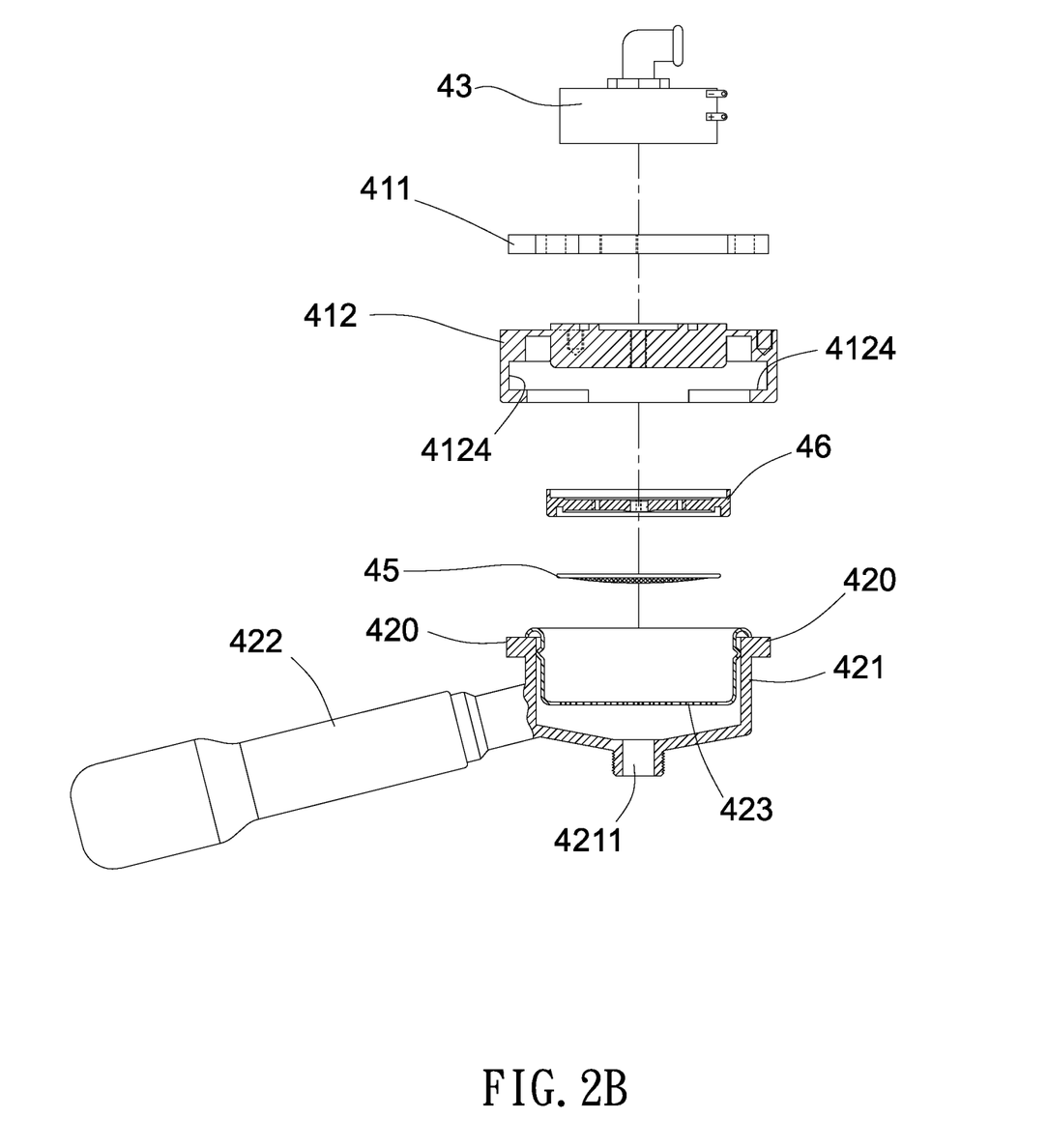
FIG. 2B is an exploded view of the elements as show in FIG. 2A.
Figure 3:
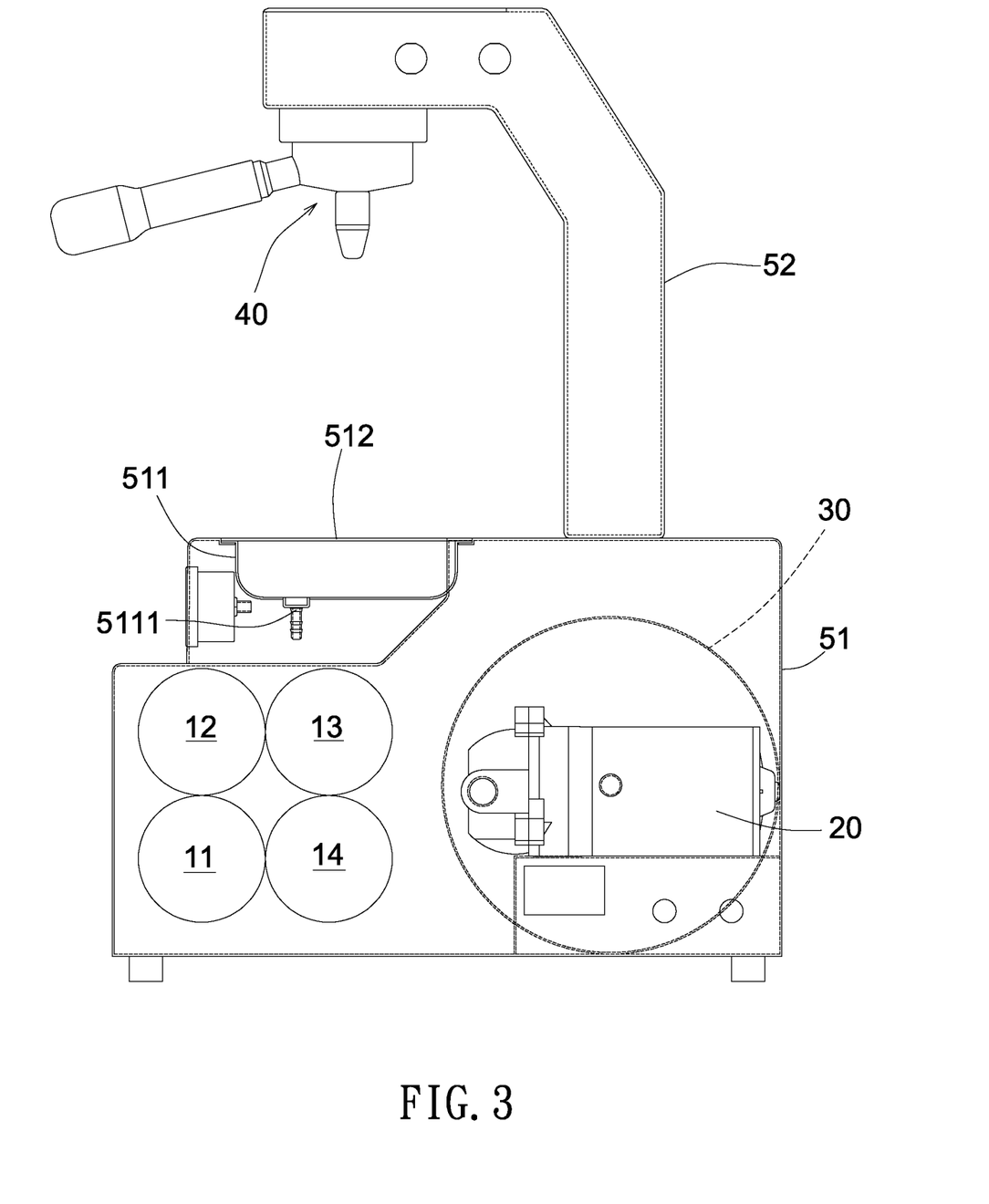
FIG. 3 is a side-view illustration of the present invention.
Figure 4:
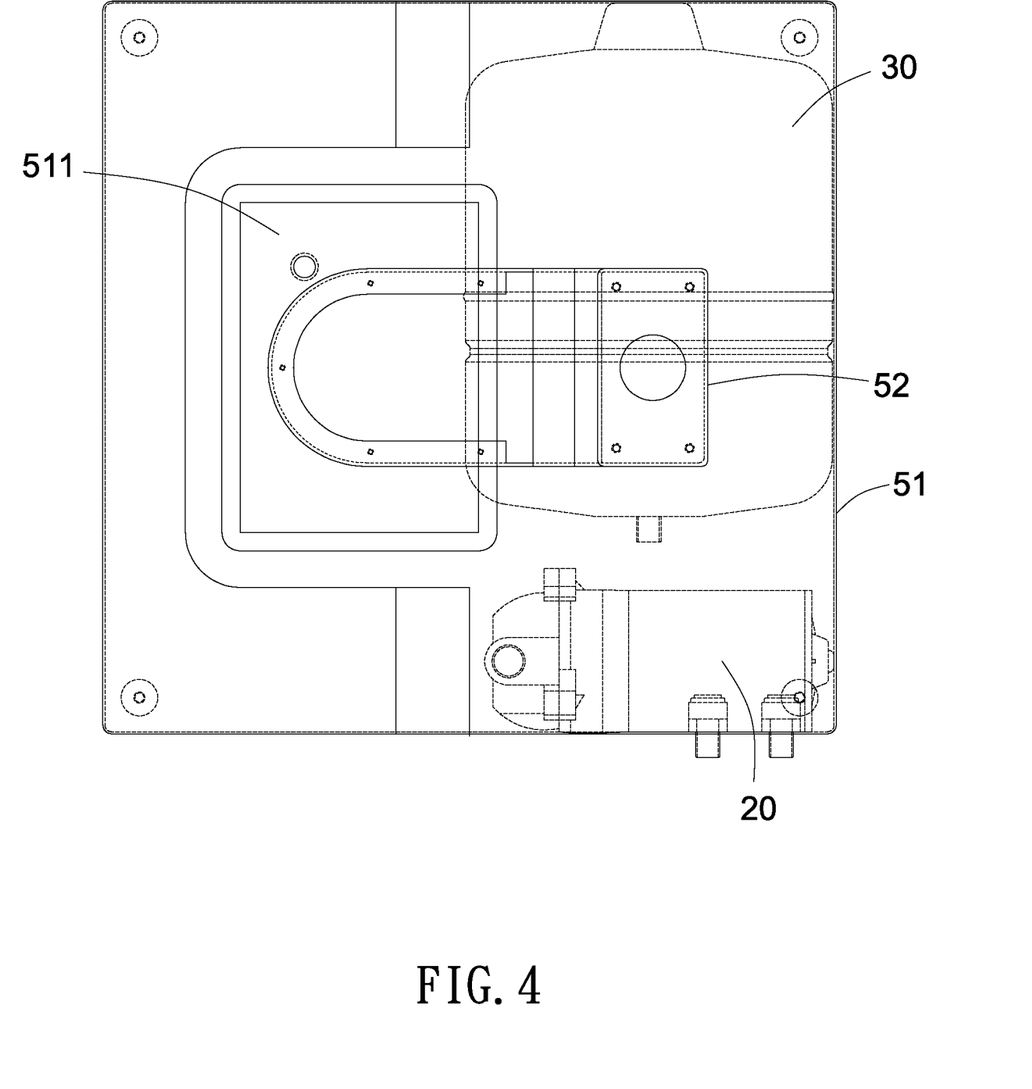
FIG. 4 is a top-view illustration of the present invention.

The detachable brewing cup 42 comprises: a cup member 421 for filling coffee powder therein, a cup filter 423 embedded or formed in the cup member 421, and a handle 422 secured to the cup member 421 for grasping use. A nozzle 47 is connected to a water discharge port 4211 formed on a bottom portion of the cup member 421, whereby a user's cup (not shown) may be positioned under the nozzle 47 for collecting the coffee solution as extracted and brewed in the cup member 421, wherein coffee powder (not shown) is loaded on the cup filter 423 within the cup member 421, and the filtered water is downwardly flowing through the coffee powder.

In the system equipment casing 51, a water drain sink 511 is formed on an upper portion of the casing 51 and is correspondingly positioned under the nozzle 47 for filtering any water dirt or coffee residue through a second coffee filter 512 formed on an upper end portion of the sink 511 when maintaining or cleaning the coffee maker. A drain port 5111 is provided on the bottom of the sink 511 for draining waste water outwardly.

The present invention further comprises an electric module 60, which includes a power-source connector box 61 connected to a power source, and a switch panel 62 for on-off control of the water pump 20 and solenoid valve 43.

When preparing a cold brew coffee by using the present invention, the water pump 20 is started by pushing bottom on the switch panel 62, wherein the suction end 201 of the water pump 20 sucks the filtered water as filtered through the clearing (or filtration) system 10, and the discharge end 202 of the pump will boost the pressure of the filtered water, thereby delivering the pressured water into tank 30. While switching on of the solenoid valve 43, the pressurized filtered water will be discharged through the holes or perforations formed in the bracket 41, coffee filter 45 and ejected to the coffee powder as stored in the cup member 421 to thereby extract ad brew the coffee efficiently. There is no heater provided in the present invention so that a coffee solution may be prepared under low temperature or room temperature which may be less than 30 degrees Centigrade.

Figure 10:
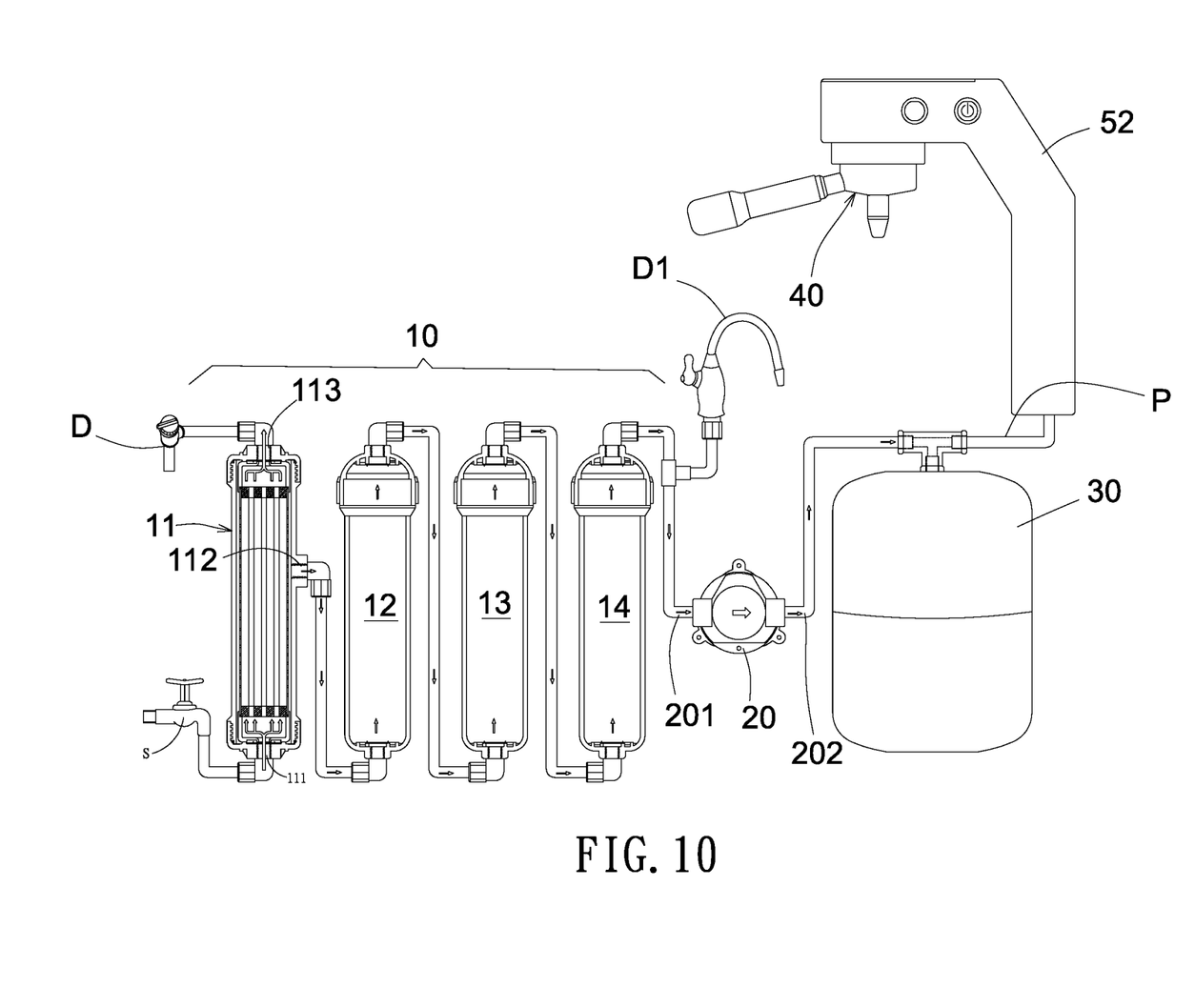
FIG. 10 shows another preferred embodiment of the present invention.

As shown in FIG. 10, a by-pass clean water pipe D1 (having a valve thereon) is provided between the filtration system 10 and the tank 30 for pick-up of filtered water directly from the filtration system 10 for serving drinking water.

The present invention is superior to the conventional coffee maker with the following advantages:

By implementing the water pump 20, the suction end 201 of the pump 20 may suck the filtered water through the filtration system 10 for obtaining filtered clean water directly from a water source like a tap water. The discharge end 202 of the pump will boost the pressure of the filtered water towards the tank 30 and the brewing module 40. Such a pressure-boosting water may help well agitation, mixing, extraction and brewing of coffee in the brewing module 40, thereby improving the coffee flavor and enriching the coffee culture for a variety of coffee lovers. By simple structure and construction for installing, assembling, or detaching the elements of the present invention, it may make the operation and maintenance of the coffee maker easier and more convenient, and may also reduce the cost thereof.

The prevent invention may be further modified without departing from the spirit and scope of this invention. Those modifications or revisions as equivalently derived from the present invention may still be fallen into the scope of this invention. The preferred embodiments as shown or claimed herewith are just served for illustration, even not yet achieving the maximum advantageous or characteristic features of the present invention.

We claim:

1. A cold brew coffee maker comprising:
   a water cleaning system including at least a water filter, and connected to a water source;
   a water pump having a suction end of the water pump connected to the water cleaning system, and a discharge end of the water pump connected to a pressurized-water storage tank for storing a filtered water in the tank; and
   a coffee brewing module connected to the pressurized-water storage tank and including: a fixing bracket formed on a cantilever of a main body, a detachable brewing cup detachably secured to the fixing bracket, a solenoid valve formed between the brewing cup and the pressurized-water storage tank, and a switch panel formed in the main body;
   whereby upon starting of the pump to suck and filter a feed water, a pressurized water less than 30 degrees centigrade will be delivered into the tank and upon actuation of the switch panel to open the solenoid valve, the pressurized water will be ejected into the cup for efficiently extracting and brewing coffee in the cup.

2. A coffee maker according to claim 1, wherein said water cleaning system includes: a first filter which is a hollow silk film filter connected to a water source; a second filter which is a mineral ceramic ball filter connected to the first filter; a third filter which is a long-fiber anti-bacterial activated-carbon filter connected to the second filter; and a fourth filter which is a silver-copper-titanium anti-bacterial activated-carbon filter connected to the third filter.

3. A coffee maker according to claim 1, wherein said main body includes a system equipment casing, and a cantilever installed on and connected to the system equipment casing; having the water cleaning system, the water pump and the pressurized water storage tank installed in the system equipment casing; and the coffee brewing module fixed on the cantilever.

4. A coffee maker according to claim 3, wherein said cantilever extends upwardly from the casing and then extends horizontally to be fixed with the coffee brewing module on a holding base formed at an end portion of the cantilever; said holding base formed with an opening for fixing an upper portion of the coffee brewing module through said opening; and a lower portion of the coffee brewing module formed on a lower side of the holding base of the cantilever.

5. A coffee maker according to claim 4, wherein said coffee brewing module further comprises: a first coffee filter, and a filter retainer for securing the first coffee filter in the filter retainer, which is then secured to a fixing bracket, and positioned between the solenoid valve and the cup.

6. A coffee maker according to claim 5, wherein a sealing ring is engaged in a fixing groove recessed in the fixing bracket in order to seal of the fixing bracket and the cup when assembled for preventing coffee leakage.

7. A coffee maker according to claim 3, wherein a water drain sink is formed on an upper portion of the casing and is correspondingly positioned under a nozzle of said coffee brewing module for filtering dirt through a coffee filter formed on an upper end portion of the sink, and having a drain port provided on the bottom of the sink.

8. A coffee maker according to claim 1, wherein said detachable brewing cup comprises: a cup member for filling coffee powder therein, a cup filter embedded or formed in the cup member, and a handle secured to the cup member for grasping use.

9. A coffee maker according to claim 8, wherein a nozzle is connected to a water discharge port formed on a bottom portion of the cup member.

10. A coffee maker according to claim 1, wherein said coffee maker further comprises an electric module, which includes a power-source connector box connected to a power source, and a switch panel for on-off control of the water pump and solenoid valve.

11. A coffee maker according to claim 1, wherein a by-pass clean water pipe having a valve formed thereon is provided between the water cleaning system and the storage tank.

* * * * *